A. CARPENTER.
DOOR LOCK.
APPLICATION FILED JUNE 17, 1909.
962,997.
Patented June 28, 1910.
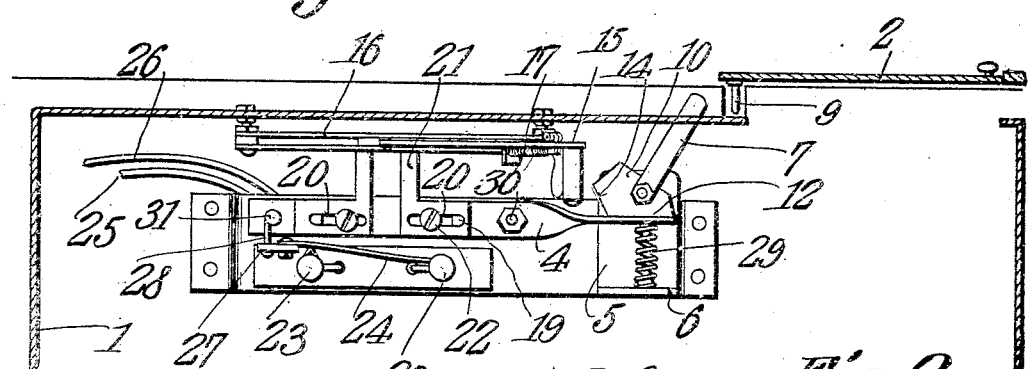
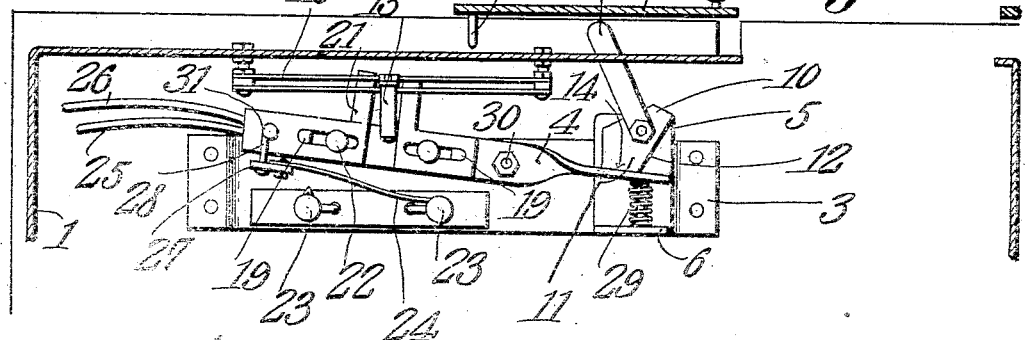
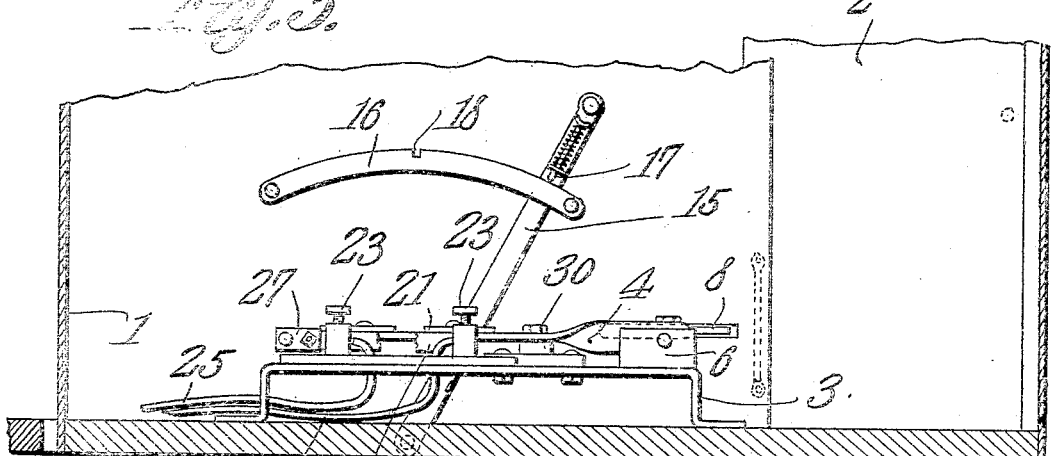
Inventor
Alexander Carpenter.
Witnesses
By C. A. Snow & Co.
Attorneys

UNITED STATES PATENT OFFICE.

ALEXANDER CARPENTER, OF FINDLAY, OHIO, ASSIGNOR, BY DIRECT AND MESNE ASSIGNMENTS, OF ONE-THIRD TO ALBERT E. KARG AND TWO-THIRDS TO WILLIAM H. BEDE, OF TOLEDO, OHIO.

DOOR-LOCK.

962,997.

Specification of Letters Patent. Patented June 28, 1910.

Application filed June 17, 1909. Serial No. 502,832.

*To all whom it may concern:*

Be it known that I, ALEXANDER CARPENTER, a citizen of the United States, residing at Findlay, in the county of Hancock and State of Ohio, have invented a new and useful Door-Lock, of which the following is a specification.

The objects of the invention are, generally, the provision, in a merchantable form, of a device of the class above described which shall be inexpensive to manufacture, facile in operation and devoid of complicated parts; specifically, the provision of novel means whereby, when the door is open, it will be impossible to move the member whereby the car is operated, the device being so constructed that, when electricity is the motive power, the circuit through the electrical conductor will be open when the door is open, and closed when the door is closed; the object, broadly speaking, being so to assemble the door of the car with the means whereby the car is moved, that the car cannot be put in motion so long as the door is open; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive and peculiar features of the device; it being understood that, within the scope of what hereinafter thus is claimed, divers changes in the form, proportions, size, and minor details of the structure may be made, without departing from the spirit or sacrificing any of the advantages of the invention.

Similar numerals of reference are employed to denote corresponding parts throughout the several figures of the drawings.

In the accompanying drawings:—Figure 1 shows my invention in top plan, the door being closed, and the parts being so located that the car may be put in motion at will; Fig. 2 is a top plan, the door being open, the parts being so positioned that it is impossible to put the car in motion; Fig. 3 is a side elevation of the device, the parts being in the positions shown in Fig. 1.

In the accompanying drawings, the numeral 1 denotes a car of any of the approved types commonly employed in elevators. The sliding door 2 may be assembled with the car proper or upon the landing in any suitable manner.

It is to be understood that, owing to the fact that the device of my invention is adapted to be used with a wide variety of elevator cars, the parts may be positioned differently in the car, from the showing made in the drawings. In order, however, to provide a complete embodiment for illustration, I have mounted upon the floor of the car adjacent the side thereof which is provided with the doorway, a bracket 3, upon which is pivoted for movement in a horizontal plane, a lever 4, a pivot element 30 uniting the lever 4, intermediate its ends, with the bracket 3 upon which it is mounted. The lever 4 is spaced vertically apart from the bracket 3, and one end of the said lever is arranged to extend over a plate 5, which is mounted upon the upper face of the bracket and arranged to project terminally, toward the wall of the car, beyond the edge of the bracket, the end of the said plate remote from the side of the car being upturned, as denoted by the numeral 6.

Pivotally mounted for movement in a horizontal plane upon the extended portion of the plate 5 is a trip comprising an arm 7 extending outward through a slot 8 in the side wall of the car. The inner face of the door 2 is provided with a shoulder 9 adapted to engage the portion of the arm 7 which extends through the slot 8, to move the arm 7 in opposite directions, as the door is opened and closed. The trip includes a head 10, which is rigidly assembled with the arm 7. This head 10 is provided with a pointed extremity 11 adapted to bear upon the adjacent end of the lever 4, the said head being provided with locking faces 12 and 14, the face 12 being adapted to engage the adjacent end of the lever 4, to hold the same firmly in position when the door is closed, as shown in Fig. 1, and the face 14 being adapted to engage the adjacent end of the lever 4 to hold the parts firmly in position when the door is open, as shown in Fig. 2.

Rising from the upper face of the lever 4 are spaced studs 19, adapted to register in slots 20 in arms 21, adapted to project laterally from the lever 4 upon which they are mounted. Set screws 22 are mounted in the slots 20 and arranged to engage the arms 21 and the lever 4.

The operating member in the present instance is shown in the form of a lever 15, rising from the bottom of the car, and it is to be understood that this member 15 may be employed to put in motion and to check any suitable motive power whereby the car may be raised and lowered. The lever 15 is inclosed by a segment 16, and the said lever is provided with any of the well known forms of latch mechanism, denoted generally by the numeral 17, and adapted to coöperate with a notch 18 in the segment, to hold the lever in position.

A description of the operation of the mechanism hereinbefore described may profitably be given at this point:—Referring to Fig. 1, wherein the door is shown in closed position, it will be seen that, through the medium of a compression spring 29, terminally assembled with the upstanding end 6 of the plate 5, and with the lever 4, the said lever is normally held in approximate parallelism with the side wall of the car, the arms 21 being held out of engagement with the operating member 15. When the parts are in this position, the operating member 15 may be moved freely, to raise or lower the car. When, however, the door 2 is moved from the closed position shown in Fig. 1 to the open position shown in Fig. 2, the shoulder 9 which projects inwardly from the door, will engage the extremity of the arm 7, tilting the said arm from the position shown in Fig. 1 to that shown in Fig. 2. The arm 7, in moving from the position shown in Fig. 1 to that shown in Fig. 2, will carry with it the head 10, the point 11 of which, engaging the adjacent end of the lever 4, will move the same laterally, the spring 29 being compressed thereby. This tilting of the lever 4 will cause the arms 21 to move outward, inclosing between them the operating member 15 and firmly holding the same against movement, it being understood that when the operating member 15 is in the position shown in Fig. 2, the power is shut off. When the parts are positioned as shown in Fig. 2, the locking face 14 of the head 10 will be in engagement with the adjacent side of the lever 4, firmly holding the parts in the position shown in Fig. 2. The operating member 15 cannot be moved from the position shown in Fig. 2, to start the car, until the parts have first been replaced in the positions shown in Fig. 1, this change necessitating a closing of the door. When the door 2 is drawn from the open position of Fig. 2 to the closed position of Fig. 1, the shoulder 9 will engage the extremity of arm 7, disposing the parts in their original position, the locking face 12 of the head 10, in such case, engaging the adjacent face of the lever 4 and holding the parts securely in the positions shown in Fig. 1.

Owing to the fact that the head 10 is provided with the locking faces 12 and 14, the head will stay in the position to which it is thrown by the door, either in the opening movement of the door, or in the closing movement thereof.

Owing to the coöperation between the slots 20 and the studs 19, the arms 21 may be spaced apart to adjust them with respect to the operating member 15, which is inclosed between them, the said arms, having been adjusted, being retained in the desired position by a tightening of the set screws 22.

The mechanism hereinbefore described is adapted to be used in connection with elevators employing as an operating member, a lever of the type denoted by the numeral 15, counterpoised weights, or hydraulic pressure, being the motive power, ordinarily, in such case. In order, however, to adapt my device for use upon elevators which are operated by electricity, I combine with the hereinbefore described mechanism, other auxiliary parts, a detailed description of which follows:

Mounted upon the bracket 3 are binding posts 23, connected by means of a resilient tongue 24, one end of which is rigidly assembled with one of said binding posts, the other end of the tongue being arranged to bear normally upon the other binding post. These binding posts 23 and the tongue 24 which unites them, form a portion of an electrical circuit, of which conductors 25 and 26 are a continuation, each of the elements 25 and 26 being terminally mounted in one of the binding posts, it being understood that the conductors 25 and 26 are operatively connected with electrically actuated means for raising and for lowering the elevator car, and that any form of manually operated switch may be interposed within the car, between the binding posts and the mechanism whereby the car is raised and lowered. The extremity of the resilient tongue 24 carries an insulating strip 27, with which is assembled one end of a connection 28, the other end of which is pivotally assembled at 31 with the extremity of the lever 4.

It is obvious that when the mechanism last above described is employed, the operating member 15 and the outstanding arms 21 which are carried by the lever 4 may be dispensed with.

The operation of the device as last above set forth does not differ materially from the operation which takes place when the device is used to lock the operating member 15 against movement. The lever 4 is actuated in the same manner and held by the same means, in its respective positions, as shown in Figs. 1 and 2. By referring to the above mentioned figures of the drawings, it will be seen that when the door 2 of the car is drawn from its closed into its open position, the resilient tongue 24 is drawn away from one of the binding posts 23, thereby breaking the electrical circuit, so that the car cannot be started until the parts have been restored to the position shown in Fig. 1, in which position the circuit is closed, whereupon the switch, or other operating member which is interposed in one of the conductors 25 or 26, may be thrown to start the car.

Having thus described my invention, what I claim as new, and desire to protect, by Letters Patent, is:—

1. A device of the class described comprising a car and a slidably mounted door; an electrical conductor carried by the car; a lever carried by the car and arranged to open and to close the circuit through the conductor; a trip carried by the car and arranged to engage the lever, said trip being engageable by the door in its opening movement to open the circuit through the conductor, and being engageable by the door in its closing movement to close the circuit through the conductor.

2. A device of the class described comprising a car and a slidably mounted door; an electrical conductor carried by the car; a lever carried by the car and arranged to open and to close the circuit through the conductor; a trip carried by the car and arranged to engage the lever, said trip being provided with locking faces to hold the lever in a position to break the circuit through the conductor and to hold the lever in a position to close the circuit through the conductor, the trip being engageable by the door in its opening movement to open the circuit through the conductor, and being engageable by the door in its closing movement to close the circuit through the conductor.

3. A device of the class described comprising a car and a slidably mounted door; a pair of binding posts carried by the car; a resilient tongue secured at one end to one of said binding posts and arranged to bear normally against the other of said posts; a lever carried by the car and connected with the tongue; a trip carried by the car and arranged to engage the lever, said trip being engageable by the door in its opening movement to draw the tongue away from the last named post, and being engageable by the door in its closing movement to permit the tongue to move into contact with said post.

4. A device of the class described comprising a car and a slidably mounted door; a pair of binding posts carried by the car; a movable bar secured at one end to one of said binding posts; a lever carried by the car and connected with the bar; a trip carried by the car and arranged to engage the lever, said trip being engageable by the door in its closing movement to tilt the bar into contact with the other of said posts, and being engageable by the door in its opening movement, to draw the bar away from the last named post.

In testimony that I claim the foregoing as my own, I have hereto affixed my signature in the presence of two witnesses.

ALEXANDER CARPENTER.

Witnesses:
 MARION G. FOSTER,
 J. D. BARNETT.